United States Patent Office.

ALFRED KERN, OF BASLE, SWITZERLAND, ASSIGNOR TO THE BADISCHE ANILIN AND SODA FABRIK, OF MANNHEIM, GERMANY.

METHYL-BLUE COLORING-MATTER.

SPECIFICATION forming part of Letters Patent No. 297,414, dated April 22, 1884.

Application filed January 10, 1884. (No specimens.)

*To all whom it may concern:*

Be it known that I, ALFRED KERN, a citizen of the Swiss Republic, residing at Basle, Switzerland, have invented new and useful Improvements in the Manufacture of a Blue Dye-Stuff or Coloring-Matter, of which the following is a specification.

This invention relates to the manufacture of a blue dye-stuff or coloring-matter produced by the condensation of alpha-phenyl-naphthylamine with tetra-methyl-diamido-benzophenone.

In carrying out this invention I take ten parts, by weight, of dry and finely-powdered tetra-methyl-diamido-benzophenone, and mix the same intimately with about nine parts, by weight, of alpha-phenyl-napthylamine, and I then add about seven parts, by weight, of oxychloride of phosphorus. The mixture thus obtained is kept constantly stirred until the reaction, which quickly sets in, and which manifests itself by a considerable rise of temperature, gradually begins to subside. I then heat the semi-fluid dark-colored product thus obtained up to a temperature of about 110° centigrade, and I maintain the said temperature during about a quarter of an hour, or until a bronze-colored "melt" is produced, which solidifies upon cooling.

In order to separate my new blue coloring-matter thus produced, the said melt is powdered, and then washed with cold water until the washings, which are green at first, begin to assume a bluish coloration. The washed residue is then dissolved in about one thousand parts of boiling water. The froth which rises to the surface is well skimmed off, and the solution thus obtained is allowed to settle, filtered, and precipitated with common salt, after the addition of about one part, by volume, of strong hydrochloric acid of about 1.18 specific gravity. The precipitated coloring-matter may be further purified by redissolving the same in about eight hundred parts of boiling water, filtering and precipitating the clear solution thus obtained, in the manner before described, and drying the precipitate at a temperature of about 80° centigrade.

The blue dye-stuff or coloring-matter prepared by the above process, and which I term "Victoria Blue B," presents the following characteristics: It has the appearance of a dark bronze-colored powder, which dissolves sparingly in cold water, and is easily soluble in boiling water, in alcohol, and glacial acetic acid, but insoluble in hydrocarbons. The color of its alcoholic solution is blue, and becomes changed, by the addition of hydrochloric acid, first into green and then into orange yellow. The reversed change takes place by the addition of alcohol to the acid solution. By adding caustic ammonia or caustic soda to the aqueous solution, the base of the coloring-matter is at once precipitated as a reddish-brown precipitate. It dissolves in concentrated sulphuric acid with an orange-yellow color.

My new coloring-matter dyes animal fiber, in a slightly acidulated bath, with a bright pure blue color, similar to that of the purest shade of triphenyl-rosaniline. It dyes equally well upon cotton prepared with the usual mordants for dyeing with soluble aniline-blue. The colors thus produced retain their pure blue shade when seen at artificial light.

What I claim as new, and desire to secure by Letters Patent, is—

As a new product, the blue dye-stuff or coloring-matter hereinbefore described, and having the characteristics above set forth.

In testimony whereof I have hereunto set my hand and seal in the presence of two subscribing witnesses.

ALFRED KERN. [L. S.]

Witnesses:
 N. HENZI,
 CHS. A. RICHTER.